United States Patent
Ishimaru et al.

(10) Patent No.: US 11,964,871 B2
(45) Date of Patent: Apr. 23, 2024

(54) IMMOBILIZED PRODUCT AND METHOD FOR PRODUCING SAME

(71) Applicant: Stella Chemifa Corporation, Osaka (JP)

(72) Inventors: Akira Ishimaru, Izumiotsu (JP); Yoshinori Sato, Izumiotsu (JP); Hironori Matsushita, Izumiotsu (JP); Kazutaka Hirano, Izumiotsu (JP); Tetsuo Nishida, Izumiotsu (JP)

(73) Assignee: STELLA CHEMIFA CORPORATION, Osaka (JP)

( * ) Notice: Subject to any disclaimer, the term of this patent is extended or adjusted under 35 U.S.C. 154(b) by 0 days.

(21) Appl. No.: 16/097,227

(22) PCT Filed: Apr. 20, 2017

(86) PCT No.: PCT/JP2017/015873
§ 371 (c)(1),
(2) Date: Oct. 26, 2018

(87) PCT Pub. No.: WO2017/188113
PCT Pub. Date: Nov. 2, 2017

(65) Prior Publication Data
US 2019/0112193 A1 Apr. 18, 2019

(30) Foreign Application Priority Data
Apr. 27, 2016 (JP) .................. 2016-088682

(51) Int. Cl.
| | |
|---|---|
| H01B 1/00 | (2006.01) |
| B82Y 30/00 | (2011.01) |
| B82Y 40/00 | (2011.01) |
| C01B 32/158 | (2017.01) |
| C01B 32/174 | (2017.01) |
| H01B 1/04 | (2006.01) |
| H01B 5/14 | (2006.01) |
| H01B 13/00 | (2006.01) |

(52) U.S. Cl.
CPC ............ *C01B 32/174* (2017.08); *B82Y 30/00* (2013.01); *B82Y 40/00* (2013.01); *C01B 32/158* (2017.08); *H01B 5/14* (2013.01); *H01B 13/00* (2013.01); *C01B 2202/02* (2013.01); *C01B 2202/22* (2013.01); *C01P 2004/13* (2013.01); *C01P 2004/64* (2013.01)

(58) Field of Classification Search
CPC ......... C01B 32/00; C01B 32/15; C01B 33/00; C01B 33/12; B82Y 10/00; B82Y 30/00; B82Y 40/00; H01B 1/04; H01B 1/18; H01B 1/24
See application file for complete search history.

(56) References Cited

U.S. PATENT DOCUMENTS

| | | | | |
|---|---|---|---|---|
| 2007/0298669 A1* | 12/2007 | Barrera | ..................... | C09C 1/56 442/198 |
| 2009/0266580 A1* | 10/2009 | Jung | ..................... | B82Y 10/00 174/126.2 |
| 2010/0032653 A1 | 2/2010 | Takeda | | |
| 2011/0039124 A1 | 2/2011 | Ikeuchi et al. | | |
| 2011/0186516 A1 | 8/2011 | Takeda | | |
| 2015/0204009 A1 | 7/2015 | Kim et al. | | |
| 2017/0106626 A1 | 4/2017 | Miyazono et al. | | |

FOREIGN PATENT DOCUMENTS

| | | |
|---|---|---|
| JP | 2005-040938 A | 2/2005 |
| JP | 2007-502246 A | 2/2007 |
| JP | 2008-050469 A | 3/2008 |
| JP | 2011-506671 A | 3/2011 |
| JP | 2014-207116 A | 10/2014 |
| JP | 2015-096485 A | 5/2015 |
| JP | 2016-113364 A | 6/2016 |
| KR | 10-0645308 B1 | 11/2006 |
| WO | WO 00/17101 A1 | 3/2000 |
| WO | WO 2007/114140 A1 | 10/2007 |

(Continued)

OTHER PUBLICATIONS

Attachment of Functionalized Single-Walled Carbon Nanotubes (SWNTs) to Silicon Surfaces, Zeng et al., Journal of Nanoscience and Nanotechnology, vol. 8, 1545-1550, 2008.*
Patterning of Single-Wall Carbon Nanotubes via a Combined Technique (Chemical Anchoring and Photolithography) on Patterned Substrates, Jung et al., J. Phys. Chem. B 2005, 109, 10584-10589.*
Chemically immobilised carbon nanotubes on silicon: Stable surfaces for aqueous electrochemistry, B.S. Flavel et al. / Electrochimica Acta 55 (2010) 3995-4001.*

(Continued)

*Primary Examiner* — Haidung D Nguyen
(74) *Attorney, Agent, or Firm* — Knobbe Martens Olson & Bear LLP

(57) ABSTRACT

To provide a novel immobilized product in which a carbon material and/or a silicon material is/are immobilized on a base material surface by a chemical bond via a linking group, and a method for producing the same. The immobilized product is an immobilized product in which a carbon material is immobilizing on a surface of a base material, wherein the carbon material is chemically bonded on the surface of the base material via a linking group, and the linking group is at least one selected from the group consisting of a —NH group, a —NH—$R^1$—NH group, a —SO group, a $R^2$ group, a —O—$R^3$—O group, and a $R^4$ group (in which the $R^1$ to $R^4$ each independently represent at least one selected from the group consisting of a chain alkyl group, a cyclic alkyl group, a chain alkenyl group, a cyclic alkenyl group, a chain alkynyl group, etc.).

15 Claims, 1 Drawing Sheet

(56) References Cited

FOREIGN PATENT DOCUMENTS

| WO | WO 2008/001998 A1 | 1/2008 |
|---|---|---|
| WO | WO 2009/119563 A1 | 10/2009 |
| WO | WO 2015/190432 A1 | 12/2015 |
| WO | WO 2016/171239 A1 | 10/2016 |

OTHER PUBLICATIONS

Sidewall Amino-Functionalization of Single-Walled Carbon Nanotubes through Fluorination and Subsequent Reactions with Terminal Diamines, Stevens et al., Nano Lett., vol. 3, No. 3, 2003, pp. 331-336.*
Covalent Binding of Single-Walled Carbon Nanotubes to Polyamide Membranes for Antimicrobial Surface Properties, Tiraferri et al., ACS Appl. Mater. Interfaces 2011, 3, 2869-2877.*
Patterned Attachment of Carbon Nanotubes to Silicon, Flavel et al., ICONN 2008, 48-51.*
Covalent Functionalization of Carbon Nanotubes, Hauke et al., Carbon Nanotubes and Related Structures, 2010, 135-198.*
Attachment Chemistry of PCBM to a Primary-Amine-Terminated Organic Monolayer on a Si(111) Surface, Miller et al., Langmuir 2014, 30, 5105-5114.*
Adsorption of C60 Buckminster Fullerenes on an 11-Amino-1-undecene-Covered Si(111) Substrate, Zhang et al., Langmuir 2008, 24, 810-820.*
International Search Report in the corresponding International Patent Application No. PCT/JP2017/015873 dated May 23, 2018.
Notice of First Office Action in Chinese Patent Application No. 201780023066.4 dated Sep. 11, 2019.
Extended European Search Report in European Patent Application No. 17789396.3 dated Aug. 19, 2019.
Office Action dated Feb. 16, 2021 issued in the corresponding Japanese Patent Application No. 2017-083548.
Office Action issued in corresponding Korean Application No. 10-2018-7031412, dated Aug. 18, 2021.

* cited by examiner

[Fig. 1]
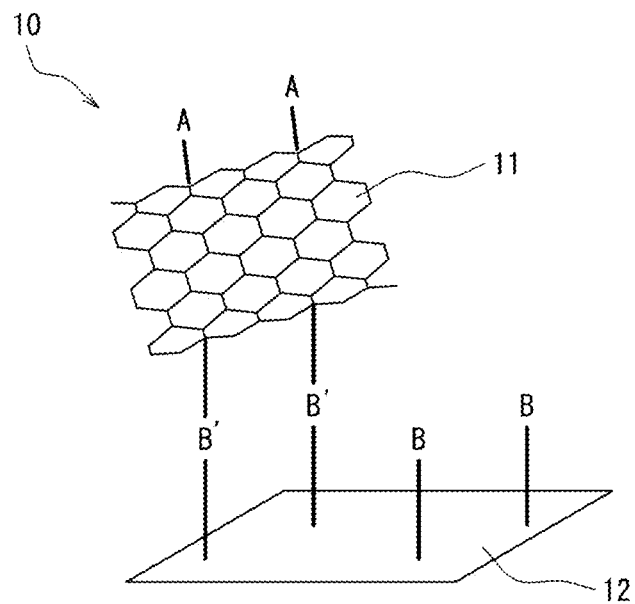
[Fig. 2]
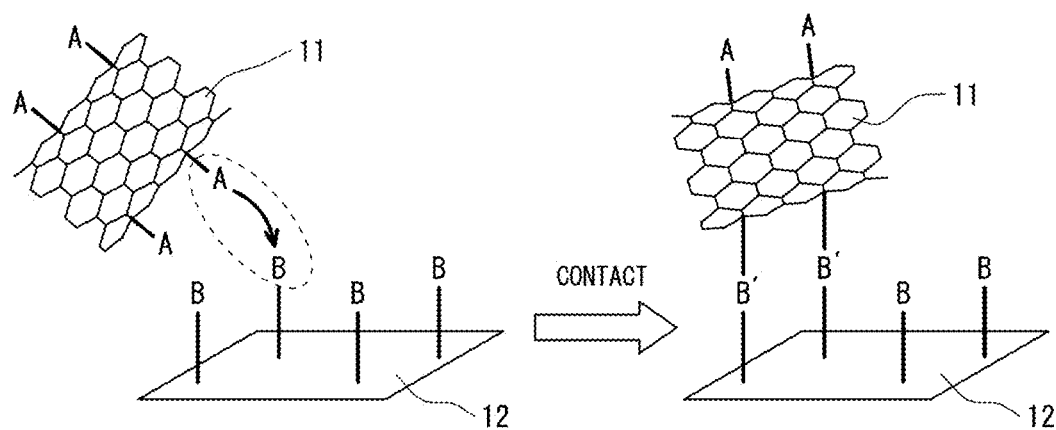

IMMOBILIZED PRODUCT AND METHOD FOR PRODUCING SAME

TECHNICAL FIELD

The present invention relates to an immobilized product and a method for producing the same, and more particularly to a novel immobilized product capable of imparting various functions such as conductivity by immobilizing carbon materials such as carbon nanotubes (CNTs) and silicon materials on a base material surface, and a method for producing the same.

BACKGROUND ART

Carbon nanotubes (CNTs) are hollow cylindrical carbon materials having a diameter of several nm to several tens of nm, composed only of $sp^2$ bonded carbon atoms. The existence of single wall carbon nanotubes (SWCNTs) and multi wall carbon nanotubes (MWCNTs) has been confirmed in CNTs.

Among CNTs, CNTs having a small number of walls are usually produced using laser ablation and arc methods. Because of high crystallinity degree, they are often excellent in properties such as conductivity. Meanwhile, a transparent conductive film is required to have particularly excellent light transmittance and conductivity. Therefore, in a conventional study on a transparent conductive film using CNTs, there have been used SWCNTs, or SWCNTs and MWCNTs having a small number of walls.

However, SWCNTs had problems that they require production costs and are easily broken due to a small diameter. To the contrary, it becomes possible for MWCNTs to suppress production costs, but it was difficult to achieve both light transmittance and conductivity required to the transparent conductive film due to a small aspect ratio, low crystallinity and many defects.

To solve the above problems, for example, Patent Document 1 discloses a transparent conductive film using, as MWCNTs, those in which the length is 10 to 5,000 μm and the number of nanotubes is $1\times10^7$ to $1\times10^{14}$ nanotubes/m² per unit area of a conductive layer. According to the disclosure of Patent Document 1, it is possible to provide a transparent conductive film which can achieve both light transmittance and conductivity in a high level.

However, the transparent conductive film disclosed in Patent Document 1 has a problem the transparent conductive film is not sufficiently fixed to the transparent base material such as a plastic base material, leading to the occurrence of peeling. Therefore, in a conventional transparent conductive film, it is necessary to further form a resin coating layer on the transparent conductive film.

PRIOR ART DOCUMENTS

Patent Documents

Patent Document 1: JP 2014-207116 A

SUMMARY OF THE INVENTION

Problems to be Solved by the Invention

It is an object of the present invention to provide a novel immobilized product in which a carbon material and/or a silicon material is/are immobilized on a base material surface by a chemical bond via a linking group, and a method for producing the same.

Solutions to the Problems

The present invention which can solve the foregoing problems provides an immobilized product in which a carbon material and/or a silicon material is/are immobilizing on a base material surface, wherein the carbon material and/or the silicon material is/are chemically bonded on the base material surface via a linking group, and the linking group is at least any one selected from the group consisting of a —NH group, a —NH—$R^1$—NH group, a —SO group, a $R^2$ group, a —O—$R^3$-O group, and a $R^4$ group (in which the $R^1$ to $R^4$ each independently represent at least one selected from the group consisting of a chain alkyl group, a cyclic alkyl group, a chain alkenyl group, a cyclic alkenyl group, a chain alkynyl group, an aryl group, and functional groups in which at least one of a hydroxyl group, a halogen, an ester group, an ether group, a carbonyl group, an amino group, an amide group, a cyano group, a thiol group, a thioester group, or a thioether group is further bonded to these functional groups).

In the above configuration, it is preferred that any one of a fluorine group, a chlorine group, a bromine group, and an iodine group exists on a surface of a carbon material and a silicon material before immobilizing on the base material surface, and at least any one selected from the group consisting of a —$NH_2$ group, a —NH—$R^1$—$NH_2$ group, a —SOCl group, a —$R^2$—MgX group (the X represents at least one selected from the group consisting of F, Cl, Br, and I), a O—$R^3$—ONa group, and a —$R^4$—Li group exists on the base material surface before immobilizing the carbon material and/or the silicon material.

In the above configuration, it is preferred that at least any one selected from the group consisting of a —$NH_2$ group, a —NH—$R^1$—$NH_2$ group, a —SOCl group, a —$R^2$—MgX group (the X represents at least one selected from the group consisting of F, Cl, Br, and I), a —O—$R^3$—ONa group, and a —$R^4$—Li group exists on a surface of a carbon material and a silicon material before immobilizing on the base material surface, and any one of a fluorine group, a chlorine group, a bromine group, and an iodine group exists on the base material surface before immobilizing the carbon material and/or the silicon material.

In the above configuration, it is preferred that the carbon material is at least any one selected from the group consisting of activated carbon, carbon nanohorn, diamond, carbon nanocoil, graphite, carbon black, diamond-like carbon, carbon fiber, graphene, amorphous carbon, fullerene, and carbon nanotube.

In the above configuration, it is preferred that the carbon material is at least any one selected from the group consisting of activated carbon, carbon nanohorn, diamond, carbon nanocoil, graphite, carbon black, diamond-like carbon, carbon fiber, graphene, amorphous carbon, fullerene, and carbon nanotube.

The present invention which can solve the foregoing problems provides a method for producing an immobilized product, which comprises: bringing a carbon material and/or a silicon material which has/have any one of a fluorine group, a chlorine group, a bromine group, and an iodine group on a surface into contact with a base material having at least any one selected from the group consisting of a —$NH_2$ group, -a NH—$R^1$—$NH_2$ group, a —SOCl group, a —$R^2$—MgX group, a —O—$R^3$—ONa group, and a —$R^4$—

Li group (in which the $R^1$ to $R^4$ each independently represent at least one selected from the group consisting of a chain alkyl group, a cyclic alkyl group, a chain alkenyl group, a cyclic alkenyl group, a chain alkynyl group, an aryl group, and functional groups in which at least one of a hydroxyl group, a halogen, an ester group, an ether group, a carbonyl group, an amino group, an amide group, a cyano group, a thiol group, a thioester group, or a thioether group is further bonded to these functional groups, and the X represents at least one selected from the group consisting of F, Cl, Br, and I) on a surface, whereby, the carbon material and/or the silicon material is/are immobilized on the base material surface by a chemical bond via at least any one linking group selected from the group consisting of a —NH group, a —NH—$R^1$—NH group, a —SO group, a $R^2$ group, a —O—$R^3$—O group, and a $R^4$ group.

The present invention which can solve the foregoing problems provides a method for producing an immobilized product, which comprises: bringing a carbon material and/or a silicon material which has/have at least any one selected from the group consisting of a —$NH_2$ group, a —NH—$R^1$—$NH_2$ group, a —SOCl group, a —$R^2$—MgX group, a —O—$R^3$—ONa group, and a —$R^4$—Li group (in which the $R^1$ to $R^4$ each independently represent at least one selected from the group consisting of a chain alkyl group, a cyclic alkyl group, a chain alkenyl group, a cyclic alkenyl group, a chain alkynyl group, an aryl group, and functional groups in which at least one of a hydroxyl group, a halogen, an ester group, an ether group, a carbonyl group, an amino group, an amide group, a cyano group, a thiol group, a thioester group, or a thioether group is further bonded to these functional groups, and the X represents at least one selected from the group consisting of F, Cl, Br, and I) on a surface into contact with a base material having any one of a fluorine group, a chlorine group, a bromine group, and an iodine group on a surface, whereby, the carbon material and/or the silicon material is/are immobilized on the base material surface by a chemical bond via at least any one linking group selected from the group consisting of a —NH group, a —NH—$R^1$—NH group, a —SO group, a $R^2$ group, a —O—$R^3$13 O group, and a $R^4$ group.

In the above configuration, it is preferred that the contacting is performed in the presence of a Lewis acid.

In the above configuration, it is preferred that at least any one selected from the group consisting of activated carbon, carbon nanohorn, diamond, carbon nanocoil, graphite, carbon black, diamond-like carbon, carbon fiber, graphene, amorphous carbon, fullerene, and carbon nanotube is used as the carbon material.

In the above configuration, it is preferred that any one of other carbon materials, other silicon materials, a natural polymer, and a synthetic polymer is used as the base material.

Effects of the Invention

The immobilized product of the present invention has a structure in which at least one of a carbon material and a silicon material is immobilized on a base material surface by a chemical bond via a linking group such as the above —NH group. Therefore, it is possible to make the resistance to peeling or the like more excellent as compared with those in which a carbon material or the like is simply laminated on a base material. Immobilization of the carbon material or the like enables imparting various functions such as conductivity, electrical static dissipative, and antistatic properties to the base material. As mentioned above, the carbon material or the like is immobilized on the base material surface by a chemical bond via a linking group, and thus achieving long-term stability of various functions.

According to the method for producing an immobilized product of the present invention, using a carbon material and/or a silicon material having any one of a fluorine group, a chlorine group, a bromine group, and an iodine group on a surface as a raw material, only by bringing the raw material into contact with a base material having the -above $NH_2$ group or the like on a surface thereof, the carbon material or the like can be easily immobilized on the base material surface via a linking group such as the —NH group. Furthermore, according to another method for producing an immobilized article of the present invention, using a carbon material and/or a silicon material having the —$NH_2$ group or the like on a surface thereof as a raw material, only by bringing the raw material into contact with a base material having any one of a fluorine group, a chlorine group, a bromine group, or an iodine group on a surface, the carbon material or the like can be easily immobilized on the base material surface via a linking group such as the —NH group.

BRIEF DESCRIPTION OF THE DRAWINGS

FIG. 1 is a conceptual diagram for explaining an immobilized product according to the embodiment of the present invention.

FIG. 2 is a conceptual diagram for explaining a method for producing an immobilized product according to the embodiment of the present invention.

DETAILED DESCRIPTION OF THE PREFERRED EMBODIMENT

Embodiment 1

<Immobilized Product>

First, an immobilized product of the present embodiment will be described. The immobilized product of the present embodiment is that in which a carbon material and/or a silicon material (hereinafter sometimes referred to as "carbon material or the like") is/are chemically bonded on a base material surface via a linking group. For example, when the carbon material is a carbon nanotube mentioned later, the immobilized product fixed on the base material is as shown in FIG. 1.

There is no particular limitation on the existence form of the carbon material or the like, and examples thereof include a film shape, a sheet shape, a plate shape, a block shape, a fibrous shape, a pellet shape, a filament shape, a tubular shape, a rod shape, or a spherical shape.

There is no particular limitation on the carbon material, and examples thereof include activated carbon, carbon nanohorn, diamond, carbon nanocoil, graphite, carbon black, diamond-like carbon, carbon fiber, graphene, amorphous carbon, fullerene, carbon nanotube and the like. Examples of the carbon nanotube include single wall carbon nanotube having a hollow cylindrical structure composed of one graphene sheet of a hexagonal network, multi wall carbon nanotube composed of a multilayered graphene sheet, fullerene tube, bucky tube, and graphite fibril. It is also possible to use, as the carbon material according to the present invention, an analogue having a basic structure of such carbon material. These carbon materials can be used alone or in combination of two or more thereof.

There is no particular limitation on the silicon material, and examples thereof include silicon simple substance, silicon carbides (SiC), silicon oxides (SiOx (0<x≤2) (specifically, for example, natural oxides of silicon, thermal silicon oxides, non-doped silicate glass compounds, phosphorus-doped silicate glass compounds, boron-doped silicate glass compounds, phosphorus- and boron-doped silicate glass compounds, TEOS, fluorine-containing silicon oxides and the like), silicon nitride ($Si_3N_4$) and the like. These silicon materials can be used alone or in combination of two or more thereof.

The linking group is at least any one selected from the group consisting of a —NH group, a —NH—$R^1$—NH group, a —SO group, a $R^2$ group, a —O—$R^3$—O group, and a $R^4$ group. $R^1$ to $R^4$ each independently represent at least one selected from the group consisting of a chain alkyl group, a cyclic alkyl group, a chain alkenyl group, a cyclic alkenyl group, a chain alkynyl group, an aryl group, and functional groups in which at least one of a hydroxyl group, a halogen, an ester group, an ether group, a carbonyl group, an amino group, an amide group, a cyano group, a thiol group, a thioester group, or a thioether group is further bonded to these functional groups. Here, "at least one of a hydroxyl group, a halogen, an ester group, an ether group, a carbonyl group, an amino group, an amide group, a cyano group, a thiol group, a thioester group, or a thioether group is further bonded to these functional groups" means that one or more hydrogen atoms constituting the functional groups are substituted with groups other than the hydrogen atom, or one or more carbon atoms constituting the functional groups are substituted with groups other than the carbon atom. It also means that both hydrogen and carbon atoms are substituted with a hydroxyl group or the like.

Examples of the chain alkyl group include those having 1 to 100 carbon atoms, preferably 1 to 50 carbon atoms, and more preferably 1 to 20 carbon atoms. More specific examples thereof include linear alkyl groups such as a methyl group, an ethyl group, an n-propyl group, an n-butyl group, an n-pentyl group, an n-hexyl group, an n-heptyl group, and an n-octyl group; and branched alkyl groups such as an isopropyl group, an isobutyl group, a tert-butyl group, and an isopentyl group.

Examples of the cyclic alkyl group include those having 3 to 30 carbon atoms, preferably 3 to 20 carbon atoms, and more preferably 3 to 12 carbon atoms. More specific examples thereof include a cyclopentyl group, a cyclohexyl group and the like. The cyclic alkyl group may be a functional group in which carbon atoms in the cyclic alkyl group are substituted with heteroatoms such as oxygen, nitrogen, and sulfur. In this case, specific examples thereof include tetrahydrofuran, piperidine, thiophene and the like.

Examples of the chain alkenyl group include those having 2 to 100 carbon atoms, preferably 2 to 50 carbon atoms, and more preferably 2 to 30 carbon atoms. More specific examples thereof include linear alkenyl groups such as an allyl group, a 3-butenyl group, a 4-hexenyl group, a 5-hexenyl group, a 7-octenyl group, and a 10-dodecenyl group; and branched alkenyl groups such as an isopropenyl group, an isobutenyl group, an isopentenyl group, and a 2-ethyl-3-hexenyl group.

Examples of the cyclic alkenyl group include those having 3 to 30 carbon atoms, preferably 3 to 20 carbon atoms, and more preferably 3 to 12 carbon atoms. More specific examples thereof include a cyclobutenyl group, a cyclopentenyl group, a cyclohexenyl group and the like.

Examples of the chain alkynyl group include those having 2 to 100 carbon atoms, preferably 2 to 50 carbon atoms, and more preferably 2 to 30 carbon atoms. More specific examples thereof include a cyclobutenyl group, a cyclopentenyl group, a cyclohexenyl group and the like.

Examples of the aryl group include those having 6 to 100 carbon atoms, preferably 6 to 50 carbon atoms, and more preferably 6 to 30 carbon atoms. More specific examples thereof include a phenyl group and a tolyl group.

Examples of the functional group in which the hydroxyl group is bonded to the chain alkyl group or the like include 4-hydroxy-2-pentynyl and the like.

Examples of the halogen capable of linking to the chain alkyl group or the like include fluorine, chlorine, bromine, and iodine. Examples of the functional group in which the halogen is bonded to the chain alkyl group or the like include 2-fluoropropane and the like.

Examples of the functional group in which the ester group is bonded to the chain alkyl group or the like include 3-methyl pentyl acetate and the like.

Examples of the functional group in which the ether group is bonded to the chain alkyl group or the like include 2-methoxybutane and the like.

Examples of the functional group in which the carbonyl group is bonded to the chain alkyl group or the like include 2-octylketone and the like.

Examples of the functional group in which the amino group is bonded to the chain alkyl group or the like include 3-trimethylaminopentane and the like.

Examples of the functional group in which the amide group is bonded to the chain alkyl group or the like include 2-amidobutane and the like.

Examples of the functional group in which the cyano group is bonded to the chain alkyl group or the like include 2-cyanobutane and the like.

Examples of the functional group in which the thiol group is bonded to the chain alkyl group or the like include 2-propylthiol and the like.

Examples of the functional group in which the thioester group is bonded to the chain alkyl group or the like include 2-thioacid S-ethylbutane and the like.

Examples of the functional group in which the thioether group is bonded to the chain alkyl group or the like include 2-dimethyl sulfide butane and the like.

The base material is preferably, for example, those composed of any one of other carbon materials, other silicon materials, a natural polymer, and a synthetic polymer. There is no particular limitation on the shape of the base material, and it is possible to use various shapes such as a film shape, a sheet shape, a plate shape, a block shape, a fibrous shape, a pellet shape, a filament shape, a tubular shape, a rod shape, and a spherical shape.

It is possible to use, as other carbon materials, the same material as the carbon material. It is possible to use, as other silicon materials, the same material as the silicon material.

Examples of the natural polymer include, but are not particularly limited to, cotton, hemp, silk, wool, leather, protein, cellulose, starch, chitin, polysaccharide, rayon, cellulose acetate, rubber, enzyme, DNA, RNA, nucleic acid and the like. Examples of the synthetic polymer include, but are not limited to, silicone resins, polysilane resins, polyethylene terephthalate (PET) resins, polyethylene naphthalate resins, polybutylene terephthalate resins, polymethyl acrylate resins, polyester-based resins such as polybutyl methacrylate, polypropyl methacrylate, polyethyl methacrylate, polymethyl methacrylate, and modified polyester, polyethylene (PE) resins, polypropylene (PP) resins, polystyrene resins, phenol resins, alkyd resins, melamine resins, urea resins, bismaleimide resins, polyolefin resins such as cyclic olefin-based resins, vinyl-based resins such as polyvinyl chloride, polyvinylidene chloride, polyvinyl alcohol, and polyvinyl acetal, polyether ether ketone (PEEK) resins, polysulfone (PSF) resins, polyethersulfone (PES) resins, polycarbonate (PC) resins, polyacetal resins, polyamide resins, polyimide resins, acrylic resins, triacetyl cellulose (TAC) resins, cycloolefin (COP) resins, fluorine resins, furan resins, polyurethane, polyoxymethylene resins, poly-ε-caprolactone resins, polybutylene succinate resins, nylon 6, nylon 66, isoprene rubbers, cis-1,4-polybutadiene, styrene-butadiene rubbers, chloroprene rubbers, acrylonitrile-butadiene rubbers, butyl rubbers, ethylene-propylene rubbers, epichlorohydrin rubbers, dimethyl silicone rubbers, fluorosilicone rubbers, perfluoro rubbers, fluorophosphazene rubbers, polyacetylene, polyaniline, polypyrrole, polythiophene, poly(p-phenylene), polyphenylene vinylene, polyacene, poly(2,5-pyridinediyl), polylactic acid and the like.

<Method for Producing Immobilized Product>

Next, a method for producing an immobilized product of the present embodiment will be described.

The method for producing an immobilized product of the present embodiment includes at least one step of bringing a carbon material and/or a silicon material which has/have any one of a fluorine group, a chlorine group, a bromine group, and an iodine group (hereinafter sometimes referred to as "substituent") on a surface into contact with a base material (see FIG. 2). When this step is performed, it is necessary that at least any one selected from the group consisting of a —$NH_2$ group, a —NH—$R^1$—$NH_2$ group, a —SOCl group, a $R^2$—MgX group, a —O—$R^3$—ONa group, and a —$R^4$—Li group ($R^1$ to $R^4$ are as mentioned above) exists on a base material surface.

[Introduction of Substituent into Carbon Material or the like]

There is no particular limitation on the method for introducing a substituent into a surface of a carbon material or the like, and various methods can be employed. Examples of the method for introducing a fluorine group into a surface of a carbon material or the like include a fluorination treatment.

The fluorination treatment is the step of bringing a treatment gas containing at least a fluorine atom-containing gas into contact with a carbon material or the like, thereby subjecting the surface to a fluorination treatment in a gas phase. Specifically, this step is to introduce a fluorine group into the surface of the carbon material or the like by a carbon-fluorine bond. Therefore, unlike an oxidation treatment for imparting an oxygen-containing functional group such as a hydroxyl group, a carbonyl group, or a carboxyl group to the edge portion of a hexagonal network plane of carbon, for example, it is possible to fluorinate the surface without causing structural defects such as damaging or decomposing the carbon material or the like.

It is possible to use, as the treatment gas, those containing a fluorine atom-containing gas in the concentration of 0.01 to 100 vol %, preferably 0.1 to 80 vol %, and more preferably 1 to 50 vol %, based on the total volume. By setting the concentration of the fluorine atom-containing gas at 0.01 vol % or more, it is possible to prevent the fluorination of the surface of the carbon material or the like from becoming insufficient.

The fluorine atom-containing gas means a gas containing a fluorine atom, and in the present embodiment, it is not particularly limited as long as it contains a fluorine atom. Examples of the fluorine atom-containing gas include hydrogen fluoride (HF), fluorine ($F_2$), chlorine trifluoride ($ClF_3$), sulfur tetrafluoride ($SF_4$), boron trifluoride ($BF_3$), nitrogen trifluoride ($NF_3$), carbonyl fluoride ($COF_2$), phosphorus pentafluoride ($PF_5$) and the like. These fluorine atom-containing gases may be used alone, or two or more fluorine atom-containing gases may be used as a mixture.

An inert gas may be contained in the treatment gas. There is no particular limitation on the inert gas, but it is not preferred to use an inert gas which reacts with the fluorine atom-containing gas, thereby exerting an adverse influence on a fluorination treatment of the carbon material or the like, an inert gas which reacts with the carbon material, thereby exerting an adverse influence, and an inert gas containing impurities which exert the adverse influence. Specific example of the inert gas include nitrogen, argon, helium, neon, krypton, xenon and the like. These inert gases may be used alone, or two or more inert gases may be used as a mixture. There is no particular limitation on purity of the inert gas, and the content of impurities which exert the adverse influence is preferably 100 ppm or less, more preferably 10 ppm or less, and particularly preferably 1 ppm or less.

When the fluorination treatment is performed, the treatment temperature is in a range of −20° C. to 600° C., preferably 0° C. to 400° C., more preferably 10° C. to 300° C., and still more preferably 10° C. to 250° C. By setting the treatment temperature at −20° C. or higher, it is possible to accelerate the fluorination treatment. Meanwhile, by setting the treatment temperature at 600° C. or lower, it is possible to suppress defects to a carbon skeleton generated with the introduction of fluorine groups into a surface of the carbon material or the like from excessively increasing, thus preventing excessive breakage of the carbon skeleton and reduction of the mechanical strength of the carbon material. It is also possible to prevent the carbon material or the like from causing thermal deformation, thus suppressing a decrease of the yield.

The treatment time (reaction time) of the fluorination treatment is in a range of 1 second to 24 hours, preferably 1 minute to 12 hours, and more preferably 1 minute to 9 hours. By setting the treatment time at 1 second or more, it is possible to sufficiently fluorinate the surface of the carbon material or the like. Meanwhile, by setting the treatment time at 24 hours or less, it is possible to prevent degradation of the producibility due to prolongation of the production time.

There is no particular limitation on pressure conditions when the fluorination treatment is performed, and the fluorination treatment can be performed under normal pressure, increased pressure, or reduced pressure. From the viewpoint of economy and safety, the fluorination treatment is preferably performed under normal pressure. There is no particular limitation on a reaction vessel for a fluorination treatment, and it is possible to employ, as the reaction vessel for performing the fluorination treatment, conventionally known reaction vessels such as a fixed bed and a fluidized bed.

There is no particular limitation on a method for bringing a treatment gas into contact with a carbon material or the like, and the contacting can be performed, for example, under a flow of the treatment gas, or in an atmosphere containing at least the treatment gas in a sealed state. The fluorination treatment may be performed plural times. This makes it possible to further introduce a fluorine group into the surface of the carbon material or the like and to further improve immobilization on the base material surface.

The fluorination treatment to the carbon material or the like may be performed on the entire surface or on an arbitrary partial region when the carbon material or the like has a film shape. When the fluorination treatment is performed on the arbitrary partial region (partial fluorination treatment), it can be performed by masking the region other than the region to be subjected to the fluorination treatment. The masking material used for masking is not particularly limited except that it has the heat resistance to the treatment temperature during the fluorination treatment. Specific examples thereof include those composed of fluorine resins such as polytetrafluoroethylene, polytetrachloroethylene, polyvinyl fluoride, polyvinylidene fluoride, polydichlorodifluoroethylene, and polytrifluorochloroethylene, ceramics, polyimide, polyether ether ketone (PEEK), metal and the like.

The post-treatment step may be performed immediately after the fluorination treatment. The post-treatment step is the step of replacing the treatment gas with an inert gas to generate an inert atmosphere and cooling the carbon material or the like to room temperature. Cooling to room temperature may be performed by allowing the carbon material or the like to cool. After evacuating to replace with an inert gas, it may be brought to atmospheric pressure with the inert gas. This makes it possible to prevent a fluorine gas from adsorbing and remaining on the surface of the fluorinated carbon material or the like. As a result, hydrogen fluoride is prevented from being produced as a by-product due to hydrolysis of the fluorine gas, so that there is no fear of the occurrence of defects in a dispersion in which the carbon material or the like after the fluorination treatment is dispersed or during use thereof. Examples of the inert gas, include but are not particularly limited, to a nitrogen gas and the like.

The method of introducing a chlorine group into a surface of a carbon material or the like includes a chlorination treatment. The chlorination treatment can be performed by bringing a treatment gas containing at least a chlorine gas into contact with a carbon material or the like. It is possible to use, as the treatment gas, those having the chlorine concentration of 0.01 to 100 vol %, preferably 0.1 to 80 vol %, and more preferably 1 to 50 vol %, based on the total volume. The treatment gas may contain the above-mentioned inert gas for the purpose of diluting the chlorine gas.

When the chlorination treatment is performed, the treatment temperature is preferably in a range of −20° C. to 600° C., more preferably 0° C. to 400° C., and particularly preferably 10° C. to 300° C. By setting the treatment temperature at −20° C. or higher, it is possible to further accelerate the chlorination treatment. Meanwhile, by setting the treatment temperature at 600° C. or lower, it is possible to prevent desorption of chlorine atoms from a carbon-chlorine bond, thus preventing a decrease of the yield.

There is no particular limitation on the treatment time of the chlorination treatment, and the treatment time (reaction time) is in a range of 1 second to 24 hours, preferably 1 minute to 12 hours, and more preferably 1 minute to 9 hours. By setting the treatment time at 1 second or more, it is possible to prevent the chlorination of the carbon material or the like from becoming insufficient, thus suppressing the immobilization of the carbon material or the like to the base material from becoming insufficient. Meanwhile, by setting the treatment time at 24 hours or less, it is possible to prevent degradation of the producibility since corresponding effect cannot be expected.

There is no particular limitation on pressure conditions and a reaction vessel to be used when the chlorination treatment is performed, and they are the same as those in the case of the fluorination treatment. The chlorination treatment may be performed plural times. This makes it possible to further introduce a chlorine group into the surface of the carbon material or the like and to further improve immobilization on the surface of the base material.

The chlorination treatment to the carbon material or the like may be performed on the entire surface or on an arbitrary partial region when the carbon material or the like has a film shape or the like. When the chlorination treatment is performed on the arbitrary partial region (partial chlorination treatment), it can be performed by masking the region other than the region to be subjected to the chlorination treatment, like the above-mentioned partial fluorination treatment. The usable masking material is not particularly limited except that it has the heat resistance to the treatment temperature during the chlorination treatment. Specifically, it is possible to suitably use the masking material used for the above-mentioned partial fluorination treatment.

Like the fluorination treatment, the post-treatment step may be performed immediately after the chlorination treatment. The post-treatment step makes it possible to prevent a chlorine gas from adsorbing and remaining on the surface of the chlorinated carbon material or the like. The step of dispersing the chlorinated carbon material or the like into a dispersion medium, usable dispersion medium, and the amount of the carbon material or the like added to the dispersion medium are the same as those in the case of the above-mentioned fluorination treatment. Therefore, detail description thereof will be omitted.

It is possible to introduce a bromine group or an iodine group into the surface of a carbon material or the like by performing a bromination treatment or an iodination treatment (hereinafter referred to as "bromination treatment or the like"). The bromination treatment or the like can be performed by bringing a treatment gas containing at least a bromine gas or an iodine gas into contact with the carbon material or the like. It is possible to use, as the treatment gas, those having the bromine or iodine concentration of 0.01 to 100 vol %, preferably 0.1 to 80 vol %, and more preferably 1 to 50 vol %, based on the total volume. The treatment gas may contain the above-mentioned inert gas for the purpose of diluting the bromine gas or the iodine gas.

The treatment temperature, the treatment time, pressure conditions and the reaction vessel used when the bromination treatment is performed are the same as those in the case of the fluorination treatment. When a carbon material or the like has the above-mentioned film shape or the like and the bromination treatment or the like is performed on an arbitrary partial region thereof, the region other than the region to be treated can be masked, like the case of the fluorination treatment.

Like the fluorination treatment and the chlorination treatment, the post-treatment step may be performed immediately after the bromination treatment or the like. The post-treatment step makes it possible to prevent a bromine gas or an iodine gas from adsorbing and remaining on the surface of the brominated or iodinated carbon material or the like. The step of dispersing the brominated or iodinated carbon material or the like into a dispersion medium, usable dispersion medium, and the amount of the carbon material or the like added to the dispersion medium are the same as those in the case of the above-mentioned fluorination treatment. Therefore, detail description thereof will be omitted.

[Introduction of —$NH_2$ Group or the like into Base Material Surface]

There is no particular limitation on the method of introducing a —$NH_2$ group, a —NH—$R^1$—$NH_2$ group, a —SOCl group, a $R^2$—MgX group, a —O—$R^3$—ONa group, or a —$R^4$—Li group into the base material surface, and known methods can be employed. For example, when introducing the —NH$_2$ group or the —NH—R$^1$—NH$_2$ group (hereinafter referred to as "—NH$_2$ group or the like"), the fluorine group is replaced with the —NH$_2$ group or the like by a treatment of subjecting a base material surface to the fluorination treatment to introduce a fluorine group and then introducing a NH$_2$ group or the like (hereinafter referred to as "treatment of introducing NH$_2$ group or the like"). In this case, a first treatment gas and the treatment conditions used for the fluorination treatment can be the same as the treatment gas and treatment conditions used for the fluorination treatment for the carbon material or the like. Therefore, detailed description thereof will be omitted.

The treatment of introducing a NH$_2$ group or the like is the step of bringing a second treatment gas containing at least a nitrogen atom-containing gas into contact with a base material surface, thereby introducing a —NH$_2$ group or the like into the surface thereof in the vapor phase. Alternatively, the treatment of introducing a —NH$_2$ group or the like may be performed by a method of applying or spraying a liquid containing at least a nitrogen atom-containing compound on a fluorinated carbon material, or a method of immersing the carbon material in a liquid containing the nitrogen atom-containing compound. Specifically, this step introduces the NH$_2$ group or the like into the surface of a carbon material or the like by a carbon-nitrogen bond.

It is possible to use, as the second treatment gas, those containing a nitrogen atom-containing gas in the concentration of 0.01 to 100 vol %, preferably 0.1 to 80 vol %, and more preferably 0.1 to 50 vol %, based on the total volume. By setting the concentration of the nitrogen atom-containing gas at 0.01 vol % or more, it is possible to prevent the introduction of the —NH$_2$ group or the like into the base material surface from becoming insufficient.

The nitrogen atom-containing gas means a gas containing a nitrogen atom, and is not particularly limited as long as it contains a nitrogen atom in the present embodiment. Examples of the nitrogen atom-containing gas include an ammonia (NH$_3$) gas, an amine-based gas and the like. The amine-based gas means a gas obtained by vaporizing an amine in a gaseous state, for example, an amine which is in a liquid state at normal temperature under normal pressure, or a gas containing an amine group of an amine which is in a gaseous state at normal temperature under normal pressure. Specific examples of the amine-based gas include amines such as ethylamine, methylamine, propylamine, isopropylamine, butylamine, and isobutylamine. These amines may be used alone or in combination of two or more thereof.

An inert gas may be contained in the second treatment gas. There is no particular limitation on the inert gas, but it is not preferred to use an inert gas which reacts with the nitrogen atom-containing gas, thereby exerting an adverse influence on the treatment of introducing a NH$_2$ group or the like of the base material, an inert gas which reacts with the base material, thereby exerting an adverse influence, and an inert gas containing impurities which exert the adverse influence. Specific examples of the inert gas include nitrogen, argon, helium, neon, krypton, xenon and the like. These inert gases may be used alone or two or more inert gases may be used as a mixture. There is no particular limitation on purity of the inert gas, and the content of impurities which exert the adverse influence is preferably 100 ppm or less, more preferably 10 ppm or less, and particularly preferably 1 ppm or less.

It is preferred that the second treatment gas does not contain an oxygen atom-containing gas. The reason is that inclusion of the oxygen atom-containing gas may lead to introduction of hydroxyl groups or carboxyl groups into a base material surface, thus exerting large damage on the base material.

When the treatment of introducing a NH$_2$ group or the like is performed, the treatment temperature is in a range of −20° C. to 300° C., preferably 0° C. to 250° C., more preferably 10° C. to 200° C., and still more preferably 10° C. to 150° C. By setting the treatment temperature at −20° C. or higher, it is possible to accelerate the treatment of introducing a NH$_2$ group or the like. Meanwhile, by setting the treatment temperature at 300° C. or lower, it is possible to prevent the base material from causing thermal deformation, thus suppressing decrease of the yield.

The treatment time (reaction time) of the treatment of introducing a NH$_2$ group or the like is in a range of 1 second to 24 hours, preferably 1 minute to 12 hours, and more preferably 1 minute to 9 hours. By setting the treatment time at 1 second or more, it is possible to sufficiently introduce a NH$_2$ group or the like into a base material surface. Meanwhile, by setting the treatment time at 24 hours or less, it is possible to prevent degradation of the producibility due to prolongation of the production time.

There is no particular limitation on pressure conditions when the treatment of introducing a NH$_2$ group or the like is performed, and the treatment can be performed under normal pressure, increased pressure, or reduced pressure. From the viewpoint of economy and safety, the treatment is preferably performed under normal pressure. There is no particular limitation on a reaction vessel for the treatment of introducing a NH$_2$ group or the like, and it is possible to employ, as the reaction vessel, conventionally known one such as a fixed bed or a fluidized bed.

There is no particular limitation on the method of bringing a second treatment gas into contact with a base material, and the contacting can be performed, for example, by sealing under flow of the second treatment gas or in an atmosphere containing at least the treatment gas. The treatment of introducing a NH$_2$ group or the like may be performed plural times. Whereby, the —NH$_2$ group or the like can be further introduced into the base material surface, thus making it possible to further improve immobilization of the carbon material or the like.

[Immobilization on Base Material Surface of Carbon Material or the like]

There is no particular limitation on the method of immobilizing a carbon material or the like on a base material surface, and examples thereof include a method of bringing a dispersion containing a carbon material or the like dispersed therein into contact with the base material. Specific examples of the contacting method include a method of immersing a base material in a dispersion containing the carbon material or the like dispersed therein, a method of applying the dispersion on a base material surface, a method of spraying the dispersion on a base material surface or the like.

When the base material is immersed in the dispersion, the base material may be immersed after the dispersion was left to stand, or immersed while stirring the dispersion. The immersion temperature is preferably −20 to 200° C., more preferably 0 to 100° C., and particularly preferably 0 to 80° C. The immersion time is preferably 1 second to 24 hours, more preferably 30 seconds to 9 hours, and particularly preferably 1 minute to 6 hours.

In the case of fabricating the dispersion, the carbon material or the like is added to a dispersion medium, followed by subjecting to stirring, disintegration in a mortar, an ultrasonic treatment, and a homogenizer treatment as required.

There is no particular limitation on the dispersion medium, and examples thereof include water, an organic solvent, and a mixed solution thereof. Examples of the organic solvent include, but are not particularly limited to, alcohols such as ethanol and isopropyl alcohol, acetone, N,N-dimethylformamide (DMF), N-methylpyrrolidone (NMP), dimethyl sulfoxide (DMSO), tetrahydrofuran (THF), cyclohexane, ionic liquid and the like. Among these organic solvents, the alcohol can maximize the dispersibility of the carbon material or the like in the present embodiment. In the present invention, the alcohol can also be added to dispersion media such as various inorganic materials, various metal materials, and various carbon materials. Even in such a case, it is possible to obtain excellent handleability during use and satisfactory dispersibility. These dispersion media may be used alone or in combination of two or more thereof.

Examples of the ionic liquid include, but are not limited to, ethylmethylimidazolium tetrafluoroborate ($EMIBF_4$), ethylmethylimidazolium bis(trifluoromethanesulfonyl)imide (EMITFSI) and the like.

The amount of the carbon material or the like to be added to the dispersion medium can be appropriately set according to the type of the carbon material or the like. Specifically, for example, the amount is preferably in a range of $0.1 \times 10^{-3}$ mass % to 25 mass %, more preferably $0.1 \times 10^{-3}$ mass % to 10 mass %, and still more preferably $0.1 \times 10^{-3}$ mass % to 5 mass %, based on the total mass of the dispersion. By setting the amount at $0.1 \times 10^{-3}$ mass % or more, it is possible to prevent the volume of the dispersion from becoming excessive. Meanwhile, by setting the amount at 25% by mass or less, it is possible to suppress the viscosity of the dispersion from becoming high, leading to deterioration of the handleability.

It is possible to bring a carbon material or the like having a substituent introduced into a surface into contact with a base material having a —$NH_2$ group or the like introduced thereinto in the presence of a Lewis acid. In this case, the Lewis acid functions as a reaction accelerator (or co-catalyst). Therefore, the reaction between the carbon material or the like and the base material is accelerated, thus making it possible to immobilize a larger amount of the carbon material or the like on the base material, and to shorten the treatment time.

Examples of the Lewis acid include, but are not limited to, $BF_3$, $SiF_4$, $PF_5$, $AsF_5$, $SbF_5$, $BBr_3$, $AlCl_3$, $AlBr_3$, $FeCl_3$, $SnCl_4$, $TiCl_4$ and the like.

There is no particular limitation on the method for immobilizing a carbon material or the like on a base material in the presence of a Lewis acid, and examples thereof include a method in which a base material having a —$NH_2$ group or the like introduced thereinto is immersed in a dispersion prepared by adding a carbon material or the like to the dispersion medium, and then an aqueous solution of a Lewis acid is added. There is no particular limitation on the amount of the aqueous solution of the Lewis acid to be added, and the amount is usually 0.1% by mass to 90% by mass, and preferably 1% by mass to 80% by mass, based on the total mass.

There is no particular limitation on the immersion time of the base material when the aqueous solution of the Lewis acid is added to the dispersion, as long as it is in a range of the above-mentioned immersion time. There is no particular limitation on the temperature (immersion temperature) of the dispersion to which the aqueous solution of the Lewis acid is added, as long as it is in a range of the above-mentioned immersion temperature.

The concentration of the Lewis acid in the aqueous solution of the Lewis acid is not particularly limited and can be appropriately set as required.

After the dispersion is brought into contact with the base material, the step of cleaning the base material may be performed. Whereby, it is possible to remove the carbon material or the like and the dispersion medium that have not been immobilized on the base material. There is no particular limitation on a cleaner to be used in the cleaning step, and examples of the cleaner include ethanol, isopropyl alcohol, water, toluene, acetone and the like. There is no particular limitation on cleaning conditions. Usually, cleaning is performed at the cleaning temperature in a range of 0° C. to 100° C. for the cleaning time in a range of 1 second to 60 minutes. There is no particular limitation on the drying method in the drying step, and examples of the drying method include natural drying, drying by blowing a nitrogen gas or the like. There is no particular limitation on drying conditions. Usually, drying is performed at the drying temperature in a range of 0° C. to 100° C. for the drying time in a range of 1 second to 24 hours.

Embodiment 2

Embodiment 2 relates to a method for producing an immobilized product and differs from the above embodiment 1 in that a carbon material or the like having at least any one selected from the group consisting of a —$NH_2$ group, a —NH—$R^1$—$NH_2$ group, -a SOCl group, a —$R^2$—MgX group, a —O—$R^3$—ONa group, and a —$R^4$—Li group ($R^1$ to $R^4$ are as mentioned above) on a surface is used as the carbon material or the like. Embodiment 2 also differs from the embodiment 1 in that a base material having any one of a fluorine group, a chlorine group, a bromine group, and an iodine group on a surface is used as the base material.

A method of introducing the —$NH_2$ group or the like into a surface of a carbon material or the like can be performed in the same manner as in the method of introducing the —$NH_2$ group or the like into the base material surface in the embodiment 1. A method of introducing any one of a fluorine group, a chlorine group, a bromine group, and an iodine group into a base material surface can be performed in the same manner as in the method of introducing any one of the fluorine group, the chlorine group, the bromine group, and the iodine group into the surface of the carbon material or the like in the embodiment 1. Thereby, the immobilized product according to the present invention can be produced.

Like Embodiment 1, according to the present embodiment, it is possible to bring a carbon material or the like having a —$NH_2$ group or the like introduced into a surface into contact with a base material having a substituent introduced thereinto in the presence of a Lewis acid. Thereby, the reaction between the carbon material or the like having a —$NH_2$ group or the like introduced thereinto and the base material having a substituent introduced thereinto is accelerated, thus making it possible to immobilize a larger amount of the carbon material or the like on the base material, and to shorten the treatment time.

The type of the Lewis acid, the method of immobilizing a carbon material or the like to a base material in the presence of the Lewis acid, the amount of an aqueous solution of the Lewis acid to be added, the immersion time, and the immersion temperature are the same as those in Embodiment 1.

(Other Items)

The immobilized product according to the present invention has a structure in which a carbon material or the like is chemically bonded on a base material surface via a linking group. Therefore, the immobilized product has such a structure that the carbon material or the like is sufficiently fixed on the base material surface and is hardly detached from the base material. The immobilized product according to the present invention can be suitably applied to, for example, a transparent conductive film, an antistatic film, an antistatic film and the like.

In the immobilized product of the present invention, a fluorine group, a chlorine group, a bromine group, an iodine group, or a —$NH_2$ group and the like may exist on the surface of the carbon material or the silicon material which is chemically bonded on the base material via a linking group.

EXAMPLES

Example 1

<Preparation of Carbon Material>

In the present example, a single wall carbon nanotube was used as a carbon material. First, 10 mg of the single wall carbon nanotube was introduced into a polytetrafluoroethylene (PTFE) vessel (volume of 5 mL) and this vessel was disposed in an electrolytically polished chamber made of SUS316L (volume of 30 mL). The atmosphere inside the chamber was replaced with nitrogen by vacuum replacement and the temperature was raised to 250° C. at 4° C./min under a nitrogen gas flow (20 mL/min), followed by an isothermal treatment for 2 hours.

The atmosphere inside the chamber was replaced with a first treatment gas prepared by diluting a fluorine gas to the concentration of 20 vol % with a nitrogen gas by vacuum replacement, and then the first treatment gas was allowed to flow at a flow rate of 25 mL/min. Furthermore, the temperature inside the chamber was raised to 250° C. at 4° C./min and a fluorination treatment of the single wall carbon nanotube was performed. The treatment time of the fluorination treatment was 4 hours. The atmosphere inside the chamber was replaced with nitrogen by vacuum replacement and, after allowing to cool to room temperature under a nitrogen gas flow (20 mL/min), a fluorinated single wall carbon nanotube was fabricated.

<Preparation of Dispersion of Carbon Material>

The fluorinated single wall carbon nanotube (1 mg) was immersed in isopropyl alcohol (10 g) as a dispersion medium and ultrasonic irradiation was performed at 42 kHz and 135 W for 2 hours to prepare a dispersion containing the fluorinated single wall carbon nanotube dispersed therein. The amount of the fluorinated single wall carbon nanotube added was about $1\times10^{-2}$ mass % based on the total mass of the dispersion.

<Preparation of PET Resin Film>

In the present example, a polyethylene terephthalate (PET) resin film (product name: LUMIRROR (registered trademark) T60, manufactured by TORAY INDUSTRIES, INC.) was used as the base material.

First, the PET resin film was disposed in an electrolytically polished chamber made of SUS316L (volume of 1,000 mL) equipped with a ribbon heater. Then, the temperature inside the chamber was raised to 50° C. under a nitrogen gas flow (20 mL/min). Thereafter, a first treatment gas prepared by diluting a fluorine gas to the concentration of 0.5 vol % with nitrogen was allowed to flow in the chamber, followed by a fluorination treatment of the PET resin film. The treatment time was 1 minute.

Subsequently, the atmosphere inside the chamber was replaced with nitrogen by vacuum replacement. Furthermore, a second treatment gas prepared by diluting a $NH_3$ gas to the concentration of 1.0 vol % with nitrogen was allowed to flow in the chamber, followed by a $NH_2$ group introduction treatment. The treatment time was 1 hour. Thereafter, the atmosphere inside the chamber was replaced with nitrogen by vacuum replacement and, after allowing to cool to room temperature under a nitrogen gas flow (20 mL/min), a PET resin film subjected to the $NH_2$ group introduction treatment was fabricated.

<Fabrication of Immobilized Product: Contact between PET Resin Film and Dispersion of Carbon Material>

The PET resin film subjected to the $NH_2$ group introduction treatment was immersed in a dispersion (10 ml) prepared by dispersing a fluorinated single wall carbon nanotube in isopropyl alcohol at room temperature. The immersion time was 60 minutes. Thereafter, the PET resin film was taken out, cleaned with isopropyl alcohol and then dried by nitrogen blow at a temperature of 19° C. to fabricate an immobilized product in which the single wall carbon nanotube is immobilized on the PET resin film surface.

Example 2

<Preparation of Carbon Material>

The fluorinated single wall carbon nanotube (5 mg) of Example 1 was placed on a boat made of alumina and this vessel was disposed in a chamber made of Ni (volume of 1,000 mL). Furthermore, the atmosphere inside the chamber was replaced with nitrogen by vacuum replacement and the temperature was raised to 100° C. at 4° C./min under a nitrogen gas flow (20 mL/min), followed by an isothermal treatment for 1 hour.

Subsequently, a second treatment gas prepared by diluting a $NH_3$ gas to the concentration of 1.0 vol % with a nitrogen gas was allowed to flow in the chamber, followed by a $NH_2$ group introduction treatment. The treatment time was 1 hour. Thereafter, the atmosphere inside the chamber was replaced with nitrogen by vacuum replacement and, after allowing to cool to room temperature under a nitrogen gas flow (20 mL/min), a single wall carbon nanotube subjected to the $NH_2$ group introduction treatment was fabricated.

<Preparation of Dispersion of Carbon Material>

The single wall carbon nanotube (1 mg) subjected to the $NH_2$ group introduction treatment was immersed in isopropyl alcohol (10 g) as a dispersion medium and ultrasonic irradiation was performed at 42 kHz and 135 W for 2 hours to prepare a dispersion containing the single wall carbon nanotube subjected to the $NH_2$ group introduction treatment dispersed therein. The amount of the fluorinated single wall carbon nanotube added was about $1\times10^{-2}$ mass % based on the total mass of the dispersion.

<Fabrication of PET Resin Film>

In the present example, a polyethylene terephthalate (PET) resin film (product name: LUMIRROR (registered trademark) T60, manufactured by TORAY INDUSTRIES, INC.) was used as the base material.

First, the PET resin film was disposed in an electrolytically polished chamber made of SUS316L (volume of 1,000 mL) equipped with a ribbon heater. Then, the temperature inside the chamber was raised to 50° C. under a nitrogen gas flow (20 mL/min). Thereafter, a first treatment gas prepared by diluting a fluorine gas to the concentration of 0.5 vol % with nitrogen was allowed to flow in the chamber, followed by a fluorination treatment of the PET resin film. The treatment time was 1 minute. Thereafter, the atmosphere inside the chamber was replaced with nitrogen by vacuum replacement and, after allowing to cool to room temperature under a nitrogen gas flow (20 mL/min), a PET resin film subjected to the fluorination treatment was fabricated.

<Fabrication of Immobilized Product: Contact between PET Resin Film and Carbon Dispersion>

The PET resin film subjected to the fluorination treatment was immersed in a dispersion (10 ml) prepared by dispersing a single wall carbon nanotube subjected to a $NH_2$ group introduction treatment in isopropyl alcohol at room temperature. The immersion time was 60 minutes. Thereafter, the PET resin film was taken out, cleaned with isopropyl alcohol and then dried by nitrogen blow at a temperature of 19° C. to fabricate an immobilized product in which the single wall carbon nanotube is immobilized on the PET resin film surface.

Example 3

<Preparation of Carbon Material and Dispersion of Carbon Material>

In the same manner as in Example 2, a single wall carbon nanotube subjected to a $NH_2$ group introduction treatment was prepared and then a dispersion containing the single wall carbon nanotube dispersed in isopropyl alcohol was obtained.

<Fabrication of PET Resin Film>

In the same manner as in Example 2, a PET resin film subjected to a fluorination treatment was fabricated.

<Fabrication of Immobilized Product: Contact between PET Resin Film and Carbon Dispersion>

In the present example, the immersion time of immersing a PET resin film subjected to a fluorination treatment in a dispersion (10 mL) containing a single wall carbon nanotube subjected to a $NH_2$ group introduction treatment dispersed in isopropyl alcohol was changed to 1 minute. In the same manner as in Example 2, except for the above, an immobilized product in which the single wall carbon nanotube is immobilized on the PET resin film surface was fabricated.

Example 4

<Preparation of Carbon Material and Dispersion of Carbon Material>

In the same manner as in Example 2, a single wall carbon nanotube subjected to a $NH_2$ group introduction treatment was prepared and then a dispersion containing the single wall carbon nanotube dispersed in isopropyl alcohol was obtained.

<Fabrication of PET Resin Film>

In the same manner as in Example 2, a PET resin film subjected to a fluorination treatment was fabricated.

<Fabrication of Immobilized Product: Contact between PET Resin Film and Carbon Dispersion>

In the present example, the PET resin film subjected to the fluorination treatment was added to a dispersion (10 mL) containing a single wall carbon nanotube subjected to a $NH_2$ group introduction treatment dispersed in isopropyl alcohol and an aqueous $BF_3$ solution having the concentration of 71% (10 mL) was also added to the dispersion. In the same manner as in Example 2, except for the above, an immobilized product in which the single wall carbon nanotube is immobilized on the PET resin film surface was fabricated.

Example 5

<Preparation of Carbon Material and Dispersion of Carbon Material>

In the same manner as in Example 2, a single wall carbon nanotube subjected to a $NH_2$ group introduction treatment was prepared and then a dispersion containing the single wall carbon nanotube dispersed in isopropyl alcohol was obtained.

<Fabrication of PET Resin Film>

In the same manner as in Example 2, a PET resin film subjected to a fluorination treatment was fabricated.

<Fabrication of Immobilized Product: Contact between PET Resin Film and Carbon Dispersion>

In the present example, the immersion time of the PET resin film after immersing a PET resin film subjected to a fluorination treatment in a dispersion (10 mL) containing a single wall carbon nanotube subjected to a $NH_2$ group introduction treatment dispersed in isopropyl alcohol and adding an aqueous $BF_3$ solution having the concentration of 71% (10 mL) was changed to 1 minute. In the same manner as in Example 2, except for the above, an immobilized product in which the single wall carbon nanotube is immobilized on the PET resin film surface was fabricated.

Example 6

<Preparation of Dispersion of Carbon Material>

In the same manner as in Example 1, a fluorinated single wall carbon nanotube was obtained. Then, this fluorinated single wall carbon nanotube (1 mg) was immersed in isopropyl alcohol (10 g) as a dispersion medium and ultrasonic irradiation was performed at 42 kHz and 135 W for 2 hours to prepare a dispersion containing the fluorinated single wall carbon nanotube dispersed therein.

<Fabrication of Silicon Substrate>

In the present example, a silicon substrate was used as the base material.

First, the silicon substrate was introduced into a PTFE vessel (volume of 100 mL) and a mixed solution (SPM) of sulfuric acid and a hydrogen peroxide solution was charged, and then silicon substrate was cleaned for 5 minutes. After replacing the mixed solution in the vessel with water, the silicon substrate was cleaned with running water for 5 minutes. Subsequently, hydrofluoric acid diluted to the concentration of 0.5 mass % with water was charged in the vessel and an oxide film of the silicon substrate surface was removed. The treatment time was 1 minute. The atmosphere inside the vessel was replaced with water, followed by cleaning with running water for 5 minutes.

Subsequently, the silicon substrate was introduced into an electrolytically polished chamber made of SUS316L (volume of 1,000 mL) equipped with a ribbon heater. Thereafter, the temperature inside the chamber was raised to 50° C. under a nitrogen gas flow (20 mL/min). Subsequently, a first treatment gas prepared by diluting a fluorine gas to the concentration of 0.5 vol % with nitrogen was allowed to flow in the chamber, followed by a fluorination treatment of the silicon substrate. The treatment time was 1 minute.

Subsequently, the atmosphere inside the chamber was replaced with nitrogen by vacuum replacement. Furthermore, a second treatment gas prepared by diluting a $NH_3$ gas to the concentration of 1.0 vol % with nitrogen was allowed to flow in the chamber, followed by a $NH_2$ group introduction treatment. The treatment time was 1 hour. Thereafter, the atmosphere inside the chamber was replaced with nitrogen by vacuum replacement and, after allowing to cool to room temperature under a nitrogen gas flow (20 mL/min), a silicon substrate subjected to the NH$_2$ group introduction treatment was fabricated.

<Fabrication of Immobilized Product: Contact between Silicon Substrate and Dispersion of Carbon Material>

A silicon substrate subjected to a NH$_2$ group introduction treatment was immersed in a dispersion (10 ml) prepared by dispersing a fluorinated single wall carbon nanotube in isopropyl alcohol at room temperature. The immersion time was 60 minutes. Thereafter, the silicon substrate was taken out, cleaned with isopropyl alcohol and then dried by nitrogen blow at a temperature of 19° C. to fabricate an immobilized product in which the single wall carbon nanotube is immobilized on the silicon substrate surface.

Comparative Example 1

In this comparative example, a PET resin film subjected to neither a fluorination treatment nor a NH$_2$ group introduction treatment was used. In the same manner as in Example 1, except for the above, contacting between the PET resin film and a dispersion of a single wall carbon nanotube subjected to a fluorination treatment was performed.

Comparative Example 2

In this comparative example, a PET resin film subjected to neither a fluorination treatment nor a NH$_2$ group introduction treatment was used. In the same manner as in Example 2, except for the above, contacting between the PET resin film and a dispersion of a single wall carbon nanotube subjected to a NH$_2$ group introduction treatment was performed.

Comparative Example 3

In this comparative example, those subjected to neither a fluorination treatment nor a NH$_2$ group introduction treatment were used as the PET resin film and the single wall carbon nanotube. Regarding a dispersion of the single wall carbon nanotube subjected to neither a fluorination treatment nor a NH$_2$ group introduction treatment, a single wall carbon nanotube (1 mg) was immersed in a mixed solution of pure water (10 g) as a dispersion medium and sodium dodecyl sulfate (0.2 g, manufactured by Wako Pure Chemical Industries, Ltd.) and then ultrasonic irradiation was performed at 42 kHz and 135 W for 2 hours to prepare a dispersion containing the single wall carbon nanotube dispersed therein. In the same manner as in Example 1, except for the above, contacting between the PET resin film and the dispersion of the single wall carbon nanotube was performed.

Comparative Example 4

In this comparative example, those subjected to neither a fluorination treatment nor a NH$_2$ group introduction treatment were used as the single wall carbon nanotube. Those prepared in Comparative Example 3 were used as the single wall carbon nanotube and the dispersion thereof. In the same manner as in Example 1, except for the above, contacting between the PET resin film and the dispersion of the single wall carbon nanotube prepared in Comparative Example 3 was performed.

Comparative Example 5

In this comparative example, the PET resin film fabricated in the same manner as in Example 1 was used. In the same manner as in Example 2, except for the above, contacting between the PET resin film and the dispersion of single wall carbon nanotube subjected to the NH$_2$ group introduction treatment was performed.

Comparative Example 6

In this comparative example, the PET resin film fabricated in the same manner as in Example 2 was used. Those prepared in Comparative Example 3 were used as the single wall carbon nanotube and the dispersion thereof. In the same manner as in Example 1, except for the above, contacting between the PET resin film and the dispersion of the single wall carbon nanotube prepared in Comparative Example 3 was performed.

Comparative Example 7

In this comparative example, the PET resin film fabricated in the same manner as in Example 2 was used. In the same manner as in Example 1, except for the above, contacting between the PET resin film and the dispersion of the single wall carbon nanotube subjected to the fluorination treatment was performed.

(Elemental Analysis)

With respect to each of the PET resin film after subjecting to the fluorination treatment and the NH$_2$ group introduction treatment fabricated in Example 1, the PET resin film after subjecting to the fluorination treatment fabricated in Example 2, and the silicon substrate after subjecting to the fluorination treatment and the NH$_2$ group introduction treatment fabricated in Example 6, elemental analysis was performed using an X-ray photoelectron spectroscopy (product name; PHI5000 VersaProbe II, manufactured by ULVAC-PHI, INCORPORATED).

With respect to each of the single wall carbon nanotubes after subjecting to the fluorination treatment fabricated in Examples 1 and 6, and the single wall carbon nanotube after subjecting to the NH$_2$ group introduction treatment fabricated in Example 2, elemental analysis was also performed in the same manner as mentioned above.

As a result, 7.3 at % of nitrogen as an amino group was detected in the PET resin film of Example 1, and 27.1 at % of fluorine was detected in the single wall carbon nanotube. In the PET resin film fabricated in Example 2, 35.6 at % of fluorine was detected, and 1.7 at % of nitrogen as an amino group was detected in the single wall carbon nanotube. In the silicon substrate fabricated in Example 6, 8.6 at % of nitrogen as an amino group was detected.

(Light Transmittance)

With respect to each of the immobilized products obtained in Examples 1 to 5, and the PET resin films obtained by treating in Comparative Examples 1 to 7, a light transmittance at 550 nm was measured using a spectrophotometer (model number: V-670, manufactured by JASCO Corporation). The light transmittance of the immobilized product of Example 1 was 85.3%, the light transmittance of the immobilized product of Example 2 was 85.1%, the light transmittance of the immobilized product of Example 3 was 85.1%, the light transmittance of the immobilized product of Example 4 was 83.2%, and the light transmittance of the immobilized product of Example 5 was 85.0%. The light transmittance of all the PET resin films prepared in Comparative Examples 1 to 7 was 85.9%, and it was confirmed that the single wall carbon nanotube is not immobilized. The light transmittance of the PET resin film before immobilizing the single wall carbon nanotubes was 85.9%.

(Surface Resistivity)

Samples were fabricated by cutting each of the immobilized products according to Examples 1 to 6 and the PET resin films obtained by treating in Comparative Examples 1 to 7 into a square shape of 5 cm in length×5 cm in width. A four-point probe was brought into close contact with the central part of each sample surface and the surface resistivity was measured by the four-point probe method. DIGITAL MULTIMETER VOAC7521A manufactured by IWATSU ELECTRIC CO., LTD. was used as a measuring device, and a four-point probe cable for measurement of the sheet resistance SR4-J manufactured by Astellatech, Inc. was used as the probe. As a result, the surface resistivity of the immobilized product of Example 1 was 414 Ω/sq. In the immobilized product of Example 2, the surface resistivity was 387 Ω/sq. In the immobilized product of Example 3, the surface resistivity was 64,240 Ω/sq. In the immobilized product of Example 4, the surface resistivity was 273 Ω/sq. In the immobilized product of Example 5, the surface resistivity was 381 Ω/sq. In the immobilized product of Example 6, the surface resistivity was 66 Ω/sq.

With respect to each of the PET resin films obtained by treating in Comparative Examples 1 to 7, the measured value of the surface resistivity of the PET resin film exceeds the measurement range of $2×10^9$ Ω/sq., thus confirming that the single wall carbon nanotube is not immobilized.

With respect to each of the PET resin film and the silicon substrate before immobilizing the single wall carbon nanotube, the measured value of the surface resistivity of the PET resin film and the silicon substrate exceeded the measurement range of $2×10^9$ Ω/sq.

(Evaluation of Immobilization)

With respect to each of the immobilized products obtained in Examples 1 to 6 and the PET resin films obtained by treating in Comparative Examples 1 to 7, a cellophane pressure-sensitive adhesive tape defined in JIS Z 1522:2009 was used. Then, the cellophane pressure-sensitive adhesive tape was stuck and peeled by the adhesive tape/adhesive sheet test method in accordance with JIS Z 0237:2009.

Next, with respect to each of the immobilized products of Examples 1 to 5, the light transmittance of the cellophane pressure-sensitive adhesive tape after peeling off was measured in the same manner as mentioned above. As a result, the light transmittance was 85.3% in Example 1, 85.1% in Example 2, 85.1% in Example 3, 83.2% in Example 4, and 85.0% in Example 5. As mentioned above, the light transmittance of each of the immobilized products of Examples 1 to 5 before sticking the cellophane pressure-sensitive adhesive tape was 85.9%, so that no change was observed in each light transmittance.

With respect to each of the immobilized products of Examples 1 to 6, the surface resistivity of the cellophane pressure-sensitive adhesive tape after peeling was also measured. As a result, the surface resistivity was 419 Ω/sq. in Example 1, 384 Ω/sq. in Example 2, 65, 130 Ω/sq. in Example 3, 280 Ω/sq. in Example 4, 387 Ω/sq. in Example 5, and 73 Ω/sq. in Example 6. The surface resistivity of each of the immobilized products of Examples 1 to 6 before sticking the cellophane pressure-sensitive adhesive tape was respectively 414 Ω/sq., 387 Ω/sq., 64,240 Ω/sq., 273 Ω/sq., 381 Ω/sq., or 66 Ω/sq., so that no significant change was observed in each surface resistivity.

Furthermore, with respect to each of the PET resin films of Comparative Examples 1 to 7, the light transmittance and the surface resistivity of the cellophane pressure-sensitive adhesive tape after peeling were measured in the same manner as mentioned above. As a result, the light transmittance was 85.9% in all examples and the measured value of the surface resistivity exceeded the measuring range of $2×10^9$ Ω/sq.

It is estimated from the above results that, with respect to each of the immobilized products of Examples 1 to 6, even after peeling of the cellophane pressure-sensitive adhesive tape, the single wall carbon nanotube is not peeled by the cellophane pressure-sensitive adhesive tape and is immobilized on the surface of the PET resin film or the silicon substrate.

DESCRIPTION OF REFERENCE SIGNS

10 Immobilized product
11 Carbon nanotube (carbon material)
12 Base material
A Substituent
B Substituent
B' Linking group

What is claimed is:

1. An immobilized product in which a carbon material is immobilizing on the surface of a base material, wherein
   the carbon material is a first carbon material that is chemically bonded directly to the surface of the base material via a linking group alone,
   the linking group is a —NH group, a —SO group, a $R^2$ group, a —O-$R^3$-O group, or a $R^4$ group, in which the $R^2$ and $R^4$ each independently represent a chain alkyl group, a cyclic alkyl group, a chain alkenyl group, a cyclic alkenyl group, a chain alkynyl group, or functional groups in which a hydroxyl group, a halogen, an ester group, an ether group, an amino group, a cyano group, a thiol group, a thioester group, or a thioether group is further bonded to the chain alkyl group, the cyclic alkyl group, the chain alkenyl group, the cyclic alkenyl group or the chain alkynyl group, and the $R^3$ represents a chain alkyl group, a cyclic alkyl group, a chain alkenyl group, a cyclic alkenyl group, a chain alkynyl group, or functional groups in which a hydroxyl group, a halogen, an ester group, an ether group, an amino group, an amide group, a cyano group, a thiol group, a thioester group, or a thioether group is further bonded to the chain alkyl group, the cyclic alkyl group, the chain alkenyl group, the cyclic alkenyl group or the chain alkynyl group, and
   the base material is a second carbon material other than said first carbon material.

2. The immobilized product according to claim 1, wherein one of a fluorine group, a chlorine group, a bromine group, and an iodine group exists on a surface of the first carbon material before immobilizing on the surface of the base material, and
   a —NH$_2$ group, a —SOCl group, a -$R^2$-MgX group the wherein X represents at least one selected from the group consisting of F, Cl, Br, and I, a O-$R^3$-ONa group, or a -$R^4$-Li group exists on the surface of the base material before immobilizing the first carbon material.

3. The immobilized product according to claim 1, wherein a —NH$_2$ group, a —SOCl group, a -$R^2$-MgX group the wherein X represents at least one selected from the group consisting of F, Cl, Br, and I, a —O-$R^3$-ONa group, or a -$R^4$-Li group exists on a surface of the first carbon material before immobilizing on the surface of the base material, and
   a group selected from the group consisting of a fluorine group, a chlorine group, a bromine group, and an iodine group exists on the surface of the base material before immobilizing the first carbon material.

4. The immobilized product according to claim 2, wherein the first carbon material is at least one selected from the group consisting of activated carbon, carbon nanohorn, diamond, carbon nanocoil, graphite, carbon black, diamond-like carbon, carbon fiber, graphene, amorphous carbon, fullerene, and carbon nanotube.

5. The immobilized product according to claim 3, wherein the first carbon material is at least one selected from the group consisting of activated carbon, carbon nanohorn, diamond, carbon nanocoil, graphite, carbon black, diamond-like carbon, carbon fiber, graphene, amorphous carbon, fullerene, and carbon nanotube.

6. A method for producing the immobilized product according to claim 1, which comprises:
bringing the first carbon material which has one of a fluorine group, a chlorine group, a bromine group, and an iodine group on a surface into contact with a base material having a —$NH_2$ group, a —SOCl group, a -$R^2$-MgX group, a —O-$R^3$-ONa group, or a -$R^4$-Li group in which the $R^2$ and $R^4$ each independently represent a chain alkyl group, a cyclic alkyl group, a chain alkenyl group, a cyclic alkenyl group, a chain alkynyl group, or functional groups in which a hydroxyl group, a halogen, an ester group, an ether group, an amino group, a cyano group, a thiol group, a thioester group, or a thioether group is further bonded to the chain alkyl group, the cyclic alkyl group, the chain alkenyl group, the cyclic alkenyl group or the chain alkynyl group, the $R^3$ represents a chain alkyl group, a cyclic alkyl group, a chain alkenyl group, a cyclic alkenyl group, a chain alkynyl group, or functional groups in which a hydroxyl group, a halogen, an ester group, an ether group, an amino group, an amide group, a cyano group, a thiol group, a thioester group, or a thioether group is further bonded to the chain alkyl group, the cyclic alkyl group, the chain alkenyl group, the cyclic alkenyl group or the chain alkynyl group, and the X represents at least one selected from the group consisting of F, Cl, Br, and I on a surface, whereby,
the first carbon material is chemically bonded directly to the surface of the base material via the linking group alone, and the linking group is a —NH group, a —SO group, a $R^2$ group, a —O-$R^3$-O group, or a $R^4$ group.

7. The method for producing an immobilized product according to claim 6, wherein the contacting is performed by immersing the base material in a dispersion in which the first carbon material is dispersed in a dispersion medium.

8. The method for producing an immobilized product according to claim 6, wherein the contacting is performed in the presence of a Lewis acid.

9. The method for producing an immobilized product according to claim 8, wherein the contacting is performed by immersing the base material in a dispersion in which the first carbon material is dispersed in a dispersion medium, and then adding an aqueous solution of the Lewis acid.

10. The method for producing an immobilized product according to claim 6, wherein at least one selected from the group consisting of activated carbon, carbon nanohorn, diamond, carbon nanocoil, graphite, carbon black, diamond-like carbon, carbon fiber, graphene, amorphous carbon, fullerene, and carbon nanotube is used as the first carbon material.

11. A method for producing the immobilized product according to claim 1, which comprises:
bringing the first carbon material which has a —$NH_2$ group, a —SOCl group, a -$R^2$ MgX group, a —O-$R^3$-ONa group, or a -$R^4$-Li, group in which the $R^2$ and $R^4$ each independently represent a chain alkyl group, a cyclic alkyl group, a chain alkenyl group, a cyclic alkenyl group, a chain alkynyl group, or functional groups in which a hydroxyl group, a halogen, an ester group, an ether group, an amino group, a cyano group, a thiol group, a thioester group, or a thioether group is further bonded to the chain alkyl group, the cyclic alkyl group, the chain alkenyl group, the cyclic alkenyl group or the chain alkynyl group, the $R^3$ presents a chain alkyl group, a cyclic alkyl group, a chain alkenyl group, a cyclic alkenyl group, a chain alkynyl group, or functional groups in which a hydroxyl group, a halogen, an ester group, an ether group, an amino group, an amide group, a cyano group, a thiol group, a thioester group, or a thioether group is further bonded to the chain alkyl group, the cyclic alkyl group, the chain alkenyl group, the cyclic alkenyl group or the chain alkynyl group, and the X represents at least one selected from the group consisting of F, Cl, Br, and I on a surface into contact with a base material having at least one of a fluorine group, a chlorine group, a bromine group, or an iodine group on a surface, whereby,
the first carbon material is chemically bonded directly to the surface of the base material via the linking group alone, and the linking group is a —NH group, a —SO group, a $R^2$ group, a —O-$R^3$-O group, or a $R^4$ group.

12. The method for producing an immobilized product according to claim 11, wherein the contacting is performed by immersing the base material in a dispersion in which the first carbon material is dispersed in a dispersion medium.

13. The method for producing an immobilized product according to claim 11, wherein the contacting is performed in the presence of a Lewis acid.

14. The method for producing an immobilized product according to claim 13, wherein the contacting is performed by immersing the base material in a dispersion in which the first carbon material is dispersed in a dispersion medium, and then adding an aqueous solution of the Lewis acid.

15. The method for producing an immobilized product according to claim 11, wherein at least one selected from the group consisting of activated carbon, carbon nanohorn, diamond, carbon nanocoil, graphite, carbon black, diamond-like carbon, carbon fiber, graphene, amorphous carbon, fullerene, and carbon nanotube is used as the first carbon material.

\* \* \* \* \*

UNITED STATES PATENT AND TRADEMARK OFFICE
CERTIFICATE OF CORRECTION

| | |
|---|---|
| PATENT NO. | : 11,964,871 B2 |
| APPLICATION NO. | : 16/097227 |
| DATED | : April 23, 2024 |
| INVENTOR(S) | : Akira Ishimaru |

It is certified that error appears in the above-identified patent and that said Letters Patent is hereby corrected as shown below:

In the Specification

In Column 3, Line 40, delete "-O-R$^3$13 O" and insert -- -O-R$^3$-O--.

In the Claims

In Column 22, Line 53-54, Claim 2, delete "group the wherein" and insert --group, wherein the--.

In Column 22, Line 59-60, Claim 3, delete "group the wherein" and insert --group, wherein the--.

In Column 23, Line 20, Claim 6, delete "group" and insert --group,--.

In Column 24, Line 8, Claim 11, delete "-R$^2$ MgX" and insert -- -R$^2$-MgX--.

In Column 24, Line 9, Claim 11, delete "-R$^4$-Li, group" and insert -- -R$^4$-Li group,--.

Signed and Sealed this
Twenty-ninth Day of October, 2024

*Katherine Kelly Vidal*

Katherine Kelly Vidal
*Director of the United States Patent and Trademark Office*